US010892687B2

(12) United States Patent
Fahlenkamp et al.

(10) Patent No.: US 10,892,687 B2
(45) Date of Patent: Jan. 12, 2021

(54) ASYMMETRIC POWER CONVERTER, POWER CONVERTERS, AND OPERATING POWER CONVERTERS

(71) Applicant: Infineon Technologies Austria AG, Villach (AT)

(72) Inventors: Marc Fahlenkamp, Geretsried (DE); Alfredo Medina-Garcia, Munich (DE)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 16/584,104

(22) Filed: Sep. 26, 2019

(65) Prior Publication Data

US 2020/0112257 A1    Apr. 9, 2020

(30) Foreign Application Priority Data

Oct. 5, 2018  (DE) .................. 10 2018 124 581

(51) Int. Cl.
*H02M 3/335*   (2006.01)
*H02M 1/00*    (2006.01)
*H02M 1/08*    (2006.01)

(52) U.S. Cl.
CPC ....... *H02M 3/33569* (2013.01); *H02M 1/083* (2013.01); *H02M 3/33592* (2013.01); *H02M 2001/0058* (2013.01)

(58) Field of Classification Search
CPC ......... H02M 3/33507; H02M 3/33515; H02M 3/33569; H02M 3/33523; H02M 3/33592; H02M 2001/0058
See application file for complete search history.

(56) References Cited

U.S. PATENT DOCUMENTS

| 6,061,252 A * | 5/2000 | Hosotani ........... H02M 3/33569 363/134 |
| 9,692,308 B2 * | 6/2017 | Yu ........................... H02M 1/32 |
| 10,170,974 B1 * | 1/2019 | Oh .......................... H02M 1/08 |
| 2012/0218793 A1 * | 8/2012 | Springett ......... H02M 3/33592 363/89 |
| 2013/0169212 A1 * | 7/2013 | Sun .................... H02M 3/3378 320/103 |
| 2013/0308347 A1 * | 11/2013 | Sato ..................... H02M 3/337 363/21.03 |
| 2014/0098572 A1 | 4/2014 | Scarlatescu et al. |
| 2015/0016153 A1 | 1/2015 | Orr et al. |

(Continued)

FOREIGN PATENT DOCUMENTS

| CN | 105375783 A | 3/2016 |
| CN | 106505865 A | 3/2017 |

OTHER PUBLICATIONS

Office Action, EP 10 2018 124 581.5, dated May 9, 2019, pp. 10.

*Primary Examiner* — Thienvu V Tran
*Assistant Examiner* — Sisay G Tiku
(74) *Attorney, Agent, or Firm* — Armis IP Law, LLC (57) ABSTRACT

Power converter controller, asymmetric power converter and method for operating a power converter. Power converter controllers, power converters and method are provided. In some configurations, first and second primary side switches of the power converter are controlled, in each switching cycle such that first a first switch is closed, then a second switch is closed and then again a first switch is closed.

34 Claims, 6 Drawing Sheets

(56) References Cited

U.S. PATENT DOCUMENTS

| | | | |
|---|---|---|---|
| 2015/0091460 A1* | 4/2015 | Kato | H02H 7/1213 |
| | | | 315/200 R |
| 2015/0365006 A1* | 12/2015 | Choi | H02M 3/33592 |
| | | | 363/21.02 |
| 2015/0381031 A1 | 12/2015 | Ghosh et al. | |
| 2016/0218623 A1 | 7/2016 | Zhang et al. | |
| 2016/0226389 A1* | 8/2016 | Quaglino | H02M 3/33592 |
| 2016/0365801 A1* | 12/2016 | Phadke | H02M 3/33569 |
| 2017/0070152 A1* | 3/2017 | Liu | H02M 3/33515 |
| 2017/0179809 A1* | 6/2017 | Choi | H02M 1/088 |
| 2017/0331386 A1* | 11/2017 | Babazadeh | H02M 1/08 |
| 2018/0054134 A1* | 2/2018 | Moon | H02M 3/33515 |
| 2018/0301975 A1* | 10/2018 | Lin | H02M 1/083 |
| 2018/0337607 A1* | 11/2018 | Drda | H02M 1/08 |
| 2019/0229630 A1* | 7/2019 | Halberstadt | H02M 1/088 |
| 2019/0260282 A1* | 8/2019 | Oh | H02M 1/08 |
| 2020/0021200 A1* | 1/2020 | Medina-Garcia | H02M 1/083 |

\* cited by examiner

ASYMMETRIC POWER CONVERTER, POWER CONVERTERS, AND OPERATING POWER CONVERTERS

RELATED APPLICATION

This application is related to and claims priority to earlier filed German patent application serial number 10 2018 124581.5 entitled "POWER CONVERTER CONTROLLER, ASYMMETRIC POWER CONVERTER AND METHOD FOR OPERATING A POWER CONVERTER," (German attorney docket no. 33481DE, 2108P51237DE), filed on Oct. 5, 2018, the entire teachings of which are incorporated herein by this reference.

TECHNICAL FIELD

The present application generally relates to power converters, controllers for such power converters and to corresponding methods.

BACKGROUND

Power converters are used to convert electrical input power to electrical output power. Examples include voltage converters which are used to convert an input voltage to an output voltage, for example to provide one or more output voltages used as power supply voltages for electronic circuits. One type of voltage converters are asymmetric converters having a transformer. Asymmetric converters have two switches on a primary side of the transformer, which may be provided in a half bridge configuration and which are driven by pulse with modulated (PWM) signals that are different for the two switches (hence the term asymmetric). One specific type of such asymmetric converters are asymmetric pulse with modulation (PWM) half bridge flyback converters referred to as APWM HB flyback converters herein. An APWM HB flyback converter is essentially a converter with an inductor of the converter being split to form a transformer, such that voltage ratios are multiplied based on a winding ratio of the transformer with an additional advantage of isolation.

Such primary side switches are usually implemented as transistors, for example metal oxide semiconductor (MOS) field effect transistors. Such field effect transistors usually have parasitic capacitances. If such a switch is switched with a voltage applied to it, the capacitance is charged, and in the switching event this charge may be lost leading to overall losses of the converter.

Furthermore, power converters in many applications, for example applications as power supplies, should maintain a regulated output voltage over a wide input voltage range (for example to adapt to mains voltages in different countries), for example from 90 VAC (alternating current) up to 264 VAC.

Different concepts have been developed to control the primary side switches of such converters to provide a regulated output voltage. Some of these concepts include so-called zero voltage switching (ZVS) and, in case of resonant converters, providing specific switching timing with respect to a resonance period of the resonance converters. Some of these techniques may be suboptimal in terms of efficiency, or other challenges may arise, depending on a desired output voltage and output load.

BRIEF DESCRIPTION OF EMBODIMENTS

According to an embodiment, a power converter controller is provided, comprising:

a first switch driver operative to drive a first primary side switch of the power converter, a second switch driver operative to control a second primary side switch of the power converter, and a control logic which, in at least one mode of operation, is operative to:

in each switching cycle, control the first switch driver to close the first primary side switch for a first time duration, after the first time duration control the first and second switch drivers to open the first and second primary side switches to be open for a first pause duration, after the first pause duration, control the second switch driver to close the second primary side switch (11, 12; 54; 814) for a second time duration, after the second time duration, control the first and second switch drivers to open the first and second primary side switches for a second pause duration, after the second pause duration, control the first switch driver to close the first primary side switch for a third time duration, and after the third time duration, control the first and second switch drivers to open the first and second primary side switches for a third pause duration.

According to an embodiment, a power converter comprising such a power converter controller is provided.

According to another embodiment, a method for controlling a power converter is provided, comprising, in each switching cycle:

closing a first primary side switch of a power converter for a first time duration, after the first time duration, opening the first primary side switch and a second primary side switch of the power converter for a first pause duration, after the first pause duration, closing the second primary side switch for a second time duration, after the second time duration, opening the first and second primary side switches for a second pause duration, after the second pause duration, closing the first primary side switch for a third time duration; and after the third time duration, opening the first and second primary side switches for a third pause duration.

The above summary is merely intended to give a brief overview over some aspects of some embodiments and is not to be construed as limiting. In particular, other embodiments may include other features than the ones explicitly recited above.

DETAILED DESCRIPTION

In the following, various embodiments will be described in detail referring to the attached drawings. These embodiments are given as examples only and are not to be construed as limiting in any way. For example, while embodiments may described as comprising a plurality of features or elements, this is not to be construed as limiting, and in other embodiments, some of the features or elements may be omitted and/or may be replaced by alternative features or elements. In addition to the features or elements explicitly described, further features or elements, for example features or elements conventionally provided in asymmetric converters, in particular asymmetric pulse width modulation, half bridge (APWM HB) flyback converter circuits, for example protection mechanisms (like over current protection) or feedback control may be used. While APWM HB flyback converters are used as an example for asymmetric converters in the following description, techniques described herein may also be applied to other asymmetric converters having a transformer, i.e. converters where two switches coupled to a primary side of a transformer are controlled by different control signals to selectively provide energy to the transformer. Another example for converters where the techniques disclosed above are LLC converters with two switches that are controlled by asymmetric pulses.

Different embodiments may be combined with each other to form further embodiments unless noted otherwise. Variations and modifications described with respect to one of the embodiments may also be applied to other embodiments.

In the embodiments shown and described, any direct electrical connection or coupling between elements, i.e. connections or couplings without intervening elements, may be replaced by an indirect connection or coupling, i.e. a connection or coupling comprising one or more additional intervening elements, and vice versa, as long as the general purpose of the connection or coupling, for example to provide a certain kind of signal, a certain kind of information or a certain kind of control, is essentially maintained. In other words, connections or couplings may be modified as long as the general purpose and function of the connection or coupling remains essentially unaltered.

In embodiments described in the following, switches of an asymmetric power converter are driven in a discontinuous conduction mode (DCM), with periods where both switches are open, and where three pulses each closing one of the switches are applied in each switching cycle as will be described in detail. In DCM, timing of the pulses, in particular a start of a first pulse of the three pulses, may depend on transformer demagnetization, which may be indicated by a corresponding signal, e.g. a signal indicating a zero crossing. This will be explained in more detail further below. It should be noted that while this mode of operation is described, this does not preclude the described embodiments from being operative to selectively also operate in other modes of operation. For example, the described mode of operation may be applied when a comparatively small load is coupled to the voltage converter, and/or when a comparatively small output voltage is required, whereas other modes of operation like a continuous conduction mode (CCM) where there is always a voltage applied to the transformer forcing current except for dead times to avoid cross conduction (i.e. avoiding for example both switches of a half bridge being closed at the same time) when a comparatively high load is applied to the converter, or a comparatively high output voltage is required.

In this respect, in the context of this application a switch is "on" or "closed" when it provides a low ohmic connection (such as a resistance lower than a threshold value) between terminals thereof, and is "off" or "open" in a state where it provides essentially an electric isolation (such as resistance above a threshold value) between the terminals (apart possibly from some leakage currents). In some embodiments, transistors like field effect transistors, bipolar transistors or insulated gate bipolar transistors may be used as switches.

Figure 1A:
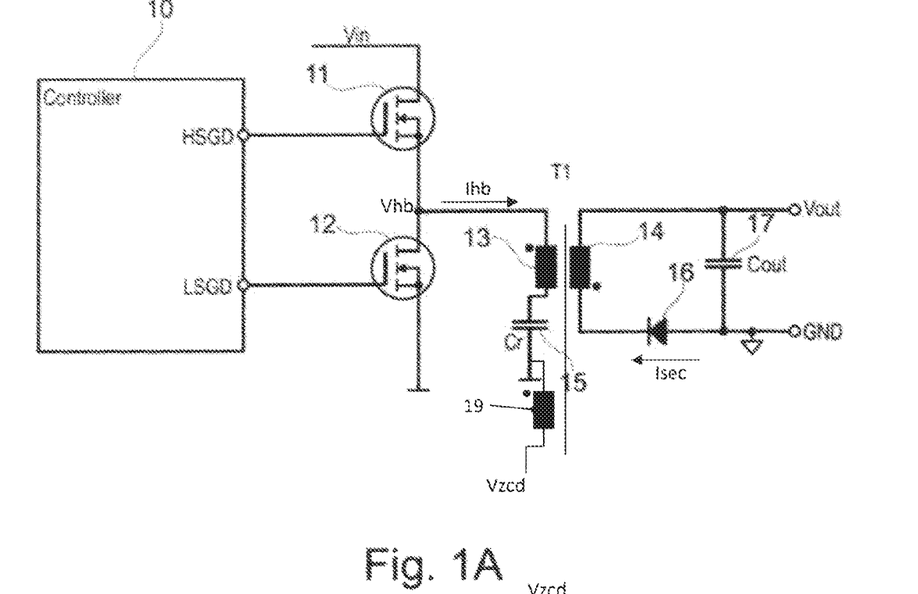
FIGS. 1A and 1B are circuit diagrams of APWM HB flyback converters according to some embodiments.

Turning now to the figures, FIG. 1A is a circuit diagram illustrating an APWM HB flyback converter according to an embodiment. The APWM HB flyback converter of FIG. 1A comprises a controller 10 controlling a high side switch 11 and a low side switch 12 via output signals HSGB, LSGB respectively. In the embodiment shown, high side switch 11 and low side switch 12 are MOS transistors. However, in other embodiments, other types of transistors may be used. High side switch 11 and low side switch 12 are coupled in series between a direct current (DC) input voltage Vin and a reference voltage, for example ground, as shown. High side switch 11 and low side switch 12 therefore form a half bridge. It should be noted that in case a alternating current (AC) voltage like a mains voltage is to be converted to an output voltage for example in power supply applications, a rectifier circuit like a diode bridge rectifier may be used to provide DC input voltage Vin based on the AC voltage.

In embodiments, controller 10 is operative to control high side switch 11 and low side switch 12 at least in one mode of operation of the converter of FIG. 1A according to discontinuous conduction mode (DCM) techniques using three pulses, each pulse closing one of switches 11, 12, which will be discussed in more detail further below referring to FIGS. 3 and 4.

A node between switches 11 and 12 is coupled to a first end of a primary winding 13 of a transformer T1. A second end of primary winding 13 is coupled to ground via a capacitor 15 having a capacitance Cr. Furthermore, capacitor 15 is coupled to an auxiliary winding 19 to provide a voltage Vzcd, which may be used by controller 10 to detect a zero crossing as will be also discussed further below and which may be used to control the timing of the afore-mentioned pulses switching switches 11, 12 on and off during discontinuous mode operation.

Transformer T1 further comprises a secondary winding 14. Dots at the windings 13, 14 and 19, as is common in the art, denote the winding orientation. In particular, in the embodiment of FIG. 1A winding 13, 19 are wound in the same direction, whereas secondary winding 14 is wound in the opposite direction to windings 13, 19.

A first end of secondary winding 14 is coupled to an output terminal to output a voltage Vout. A ground terminal GND is coupled to a second end of secondary winding 14 via a diode 16. Furthermore, an output capacitor 17 having a capacitance Cout is coupled between the output terminal and the ground terminal as shown, acting essentially as a filter.

A leakage inductance of transformer T1, in particular of primary winding 13, and capacitor 15 form an LC resonator, which influences the behavior of the flyback converter of FIGS. 1A and 1n particular define a resonance period. Such a resonator is also referred to as resonant tank.

Transistor switches like switches 11, 12 may have a parasitic capacitance. Switching such a transistor from off to on when a voltage is applied across the transistor may cause electrical losses as the capacitor is discharged. Therefore, some embodiments aim at maintaining a switching of one or both of the switches, at a low voltage (at or near 0) applied to it, also referred to as zero voltage switching (ZVS). In some embodiments described herein, this may be affected by controlling the respective other switch to be on for a certain time by one of the three pulses mentioned above, as will be explained further below in more detail.

Figure 1B:
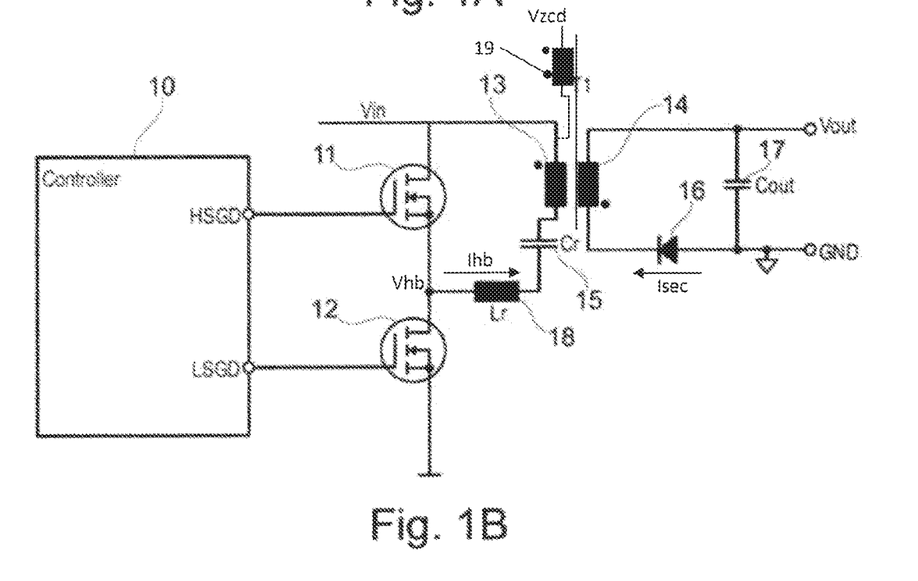

In the embodiments of FIG. 1A, primary winding 13 is coupled between the node between switches 11, 12 and ground. In other embodiments, the primary winding and capacitor 15 may be coupled between the node between switches and the input voltage Vin. In such embodiments, the roles of the high side switch and low side switch are exchanged. An example for such an embodiment is shown in FIG. 1B. In FIG. 1B, primary winding 13 and capacitor 15 are coupled between Vin and the node between high side switch 11 and low side switch 12. Furthermore, in the embodiment of FIG. 1B an additional inductor 18 is provided between capacitor 15 and the node between transistors 11, 12. This additional inductor may also be omitted in other embodiments. In yet other embodiments, an additional inductor may also be provided in the embodiment of FIG. 1A between the first end of primary winding and the node between switches 11, 12.

For later explanations, a current flowing to the primary winding in FIGS. 1A and 1B is denoted Ihb and a current on the secondary side is denoted Isec.

Figure 2:
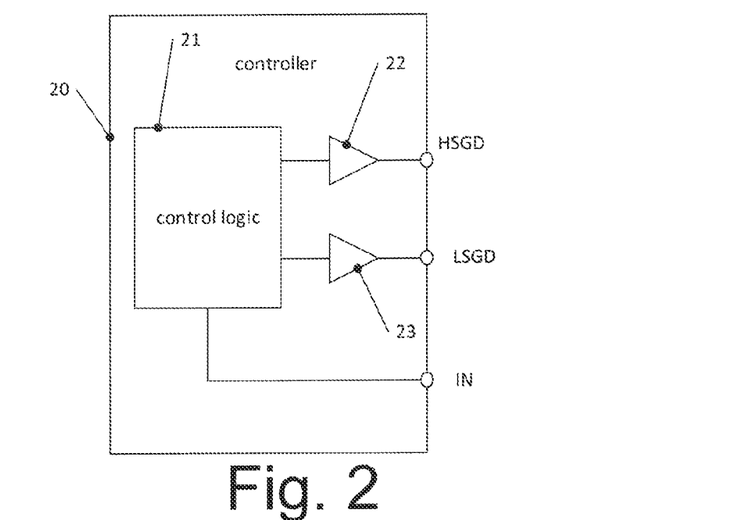
FIG. 2 is a block diagram of a power converter controller according to an embodiment.

FIG. 2 is a schematic diagram of a controller 20 according to an embodiment, which may be used as controller 10 in the embodiments of FIGS. 1 and 2. Controller 20 of FIG. 2 comprises a control logic 21. Control logic 21 may be comprise one or more logic circuits, one or more application specific integrated circuits (ASICs), one or more processors and/or other control circuits. In case of processors, these may be programmed by a corresponding computer program, which may be provided on a tangible storage medium. Control logic 21 receives one or more input signals IN via one or more input terminals. Input signals IN may, for example, comprise a signal derived from Vzcd in FIGS. 1 A and 1B, may contain information about an input voltage (Vin) and/or information about a required or actual output voltage (for example Vout in FIGS. 1A and 1B).

Any input signals also used in conventional voltage converters based on which voltage converters, in particular asymmetric converters, may additionally be used.

In response to the one or more input signals IN, control logic 31 controls a high side driver 22 to output a control signal HSGD to control a high side switch (for example high side switch 11 of FIGS. 1 and 2) and controls a low side driver 33 to output a control signal LSGD to control a low side switch (for example low side switch 12 of FIGS. 1 and 2) to generate a required output voltage. In particular, for operating an asymmetric power converter like the APWM HB flyback converters shown in FIGS. 1A and 1B the switches may be controlled using a control scheme explained now in detail referring to FIGS. 3 and 4 using a discontinuous operation and using three control pulses.

Figure 3:
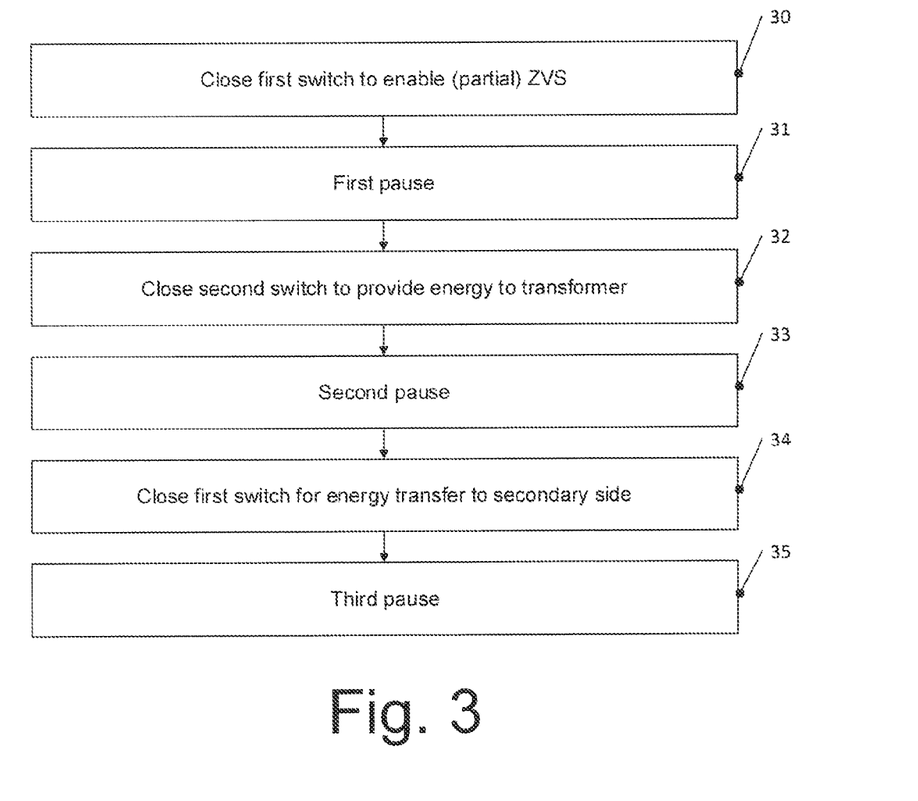
FIG. 3 is a flow chart illustrating a method according to some embodiments.
Figure 4:
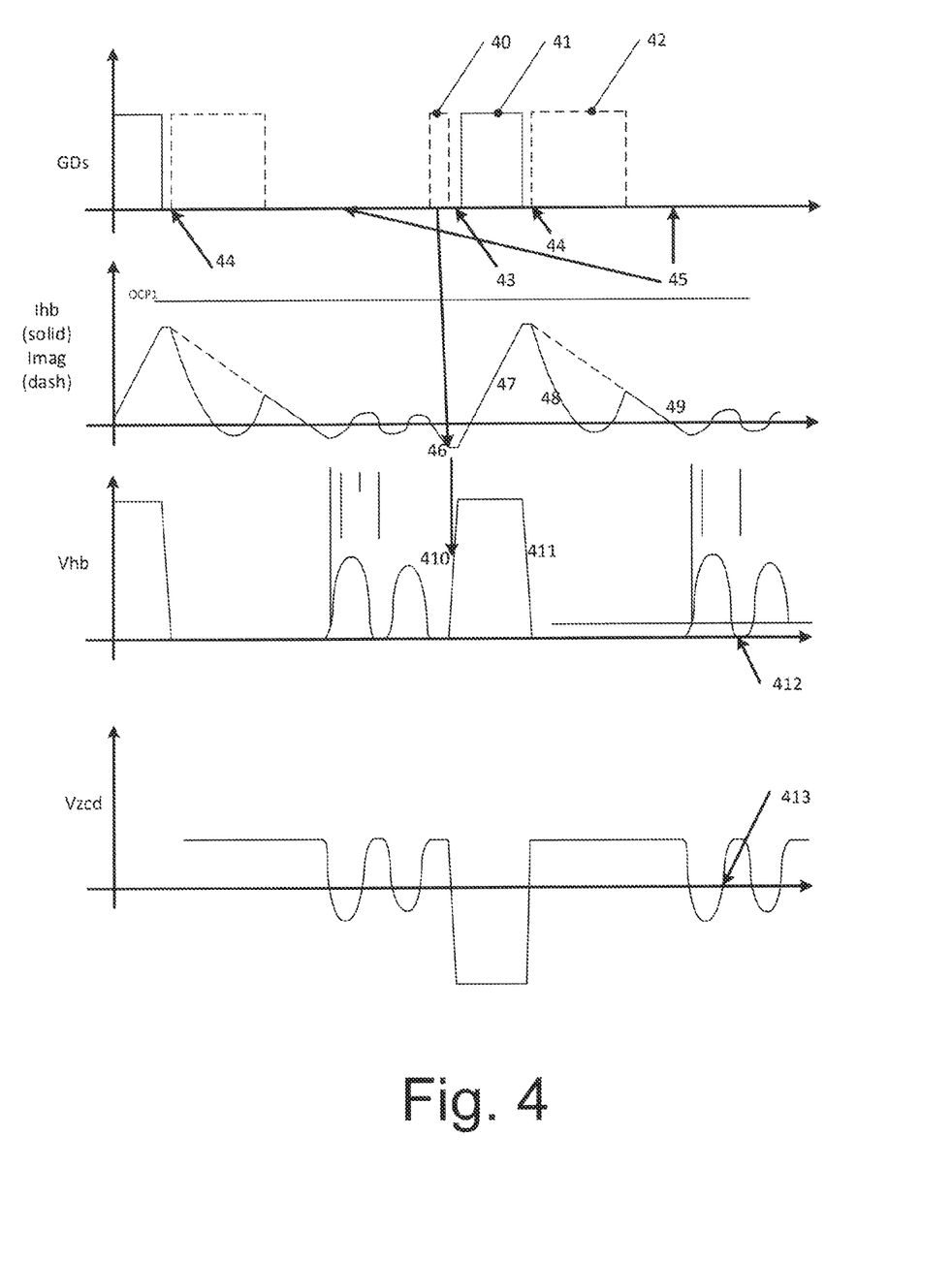
FIG. 4 is a diagram illustrating example signal for the method of FIG. 3.

The control technique described referring to FIGS. 3 and 4 is described in the following mainly for a converter like the converter of FIG. 1 A, where a primary winding of a transformer is coupled between a node between switches and ground. The techniques discussed may also be applied to a converter like the converter of FIG. 1B. As already mentioned, in this case the roles of high side switch and low side switch are reversed, i.e. instead switching the high side switch on the low side switch is switched on and vice versa, and voltages Vin and Ground are also exchanged for the purpose of the following explanation, such that a voltage minimum in the following explanation may then correspond to the other extremum, i.e. a maximum.

FIG. 3 illustrates a method according to an embodiment. FIG. 4 illustrates example signals for the method of FIG. 3 for a better illustration. It should be noted that these signals serve only for illustration, and actual signal waveforms in implementations may differ depending on the specific implementation and design of components thereof.

The flowchart of FIG. 3 illustrates switching in one switching cycle. For illustrating the method in FIG. 4, a topmost graph illustrates the signals HSGD, LSGD used for controlling a high side switch and a low side switch. Pulses of signal LSGD controlling the low side switch in FIG. 1A are shown in dashed lines, while pulses of signal HSGD controlling high side switch 11 in FIG. 1A are shown in solid lines. A high state of the respective pulse indicates the respective switch being closed and a low state indicates the respective switch being opened. As mentioned, for the configuration of FIG. 1B, the roles of high side switch and low side switch would be reversed.

The low side switch in FIG. 1A is also referred to as Tswitch, and the high side switch is also sometimes referred to as Cswitch.

Vhb is the voltage at the node between high side switch 11 and low side switch 12.

A middle graph shows the current Ihb flowing to the primary winding of the transformer in solid lines and a magnetizing current Imag in dashed lines. The magnetizing current Imag is a current associated with the magnetic flux in the transformer core (for example of transformer T1 of FIG. 1A), or in other words the portion of the transformer input current that leads to magnetic flux. Furthermore, FIG. 4 comprises a graph illustrating the voltage Vhb and a graph illustrating the voltage Vzcd.

For better illustration, the method of FIG. 3 will be described referring to FIG. 1A. However, the method may also be applied to other asymmetric converter configurations.

At 30 in FIG. 3, the method comprises closing a first switch, in the example of FIGS. 1A and 4 the low side switch, to enable zero voltage switching or partial zero voltage switching for the second switch (in case of FIGS. 1A and 4 the high side switch) later on. As will be explained further below, the time when the first switch is closed may be determined by the voltage Vzcd. In FIG. 4, this corresponds to a first pulse 40 applying a control voltage to the low side switch to close the same. This closing of the first switch induces a current marked at 46 in FIG. 4. After closing the first switch with pulse 40, at 31 a first pause follows indicated by numeral 43 in FIG. 4. Through the induced current 46 induced by the first pulse 40, during the first pause the voltage Vhb raises as indicated by numeral 410 in FIG. 4, to be at or near the input voltage Vin. When Vhb approximates Vin, the voltage across the second switch (high side switch 11 of FIG. 1A) is reduced, for example brought to at or near zero, which reduces energy losses when switching high side switch 11.

At 32, the second switch (high side switch 11 in case of FIG. 1A) is closed to provide energy to the transformer and to capacitor 15. In FIG. 4, this closing of the second switch is caused by a second pulse 41. Corresponding to second pulse 41, Ihb increases and is reversed corresponding to the current flow at 46, as denoted by reference numeral 47. In other words, during this phase energy is stored in the transformer as well as in capacitance 15 of FIG. 1A.

After this closing of the second switch at 32, a second pause follows at 33 in FIG. 3, denoted with numeral 44 in FIG. 4. During this second pause, as denoted by reference numeral 411 in FIG. 4, the voltage Vhb decreases driven by the current Ihb induced during second pulse 41. This reduces the voltage across the first switch (low side switch 12 of FIG. 1A) as Vhb comes nearer to ground, thus reducing switching losses when switching on this switch after the second pause.

The first switch is switched on again at 34 to transfer energy to the secondary side. Due to the reduced voltage Vhb, zero voltage switching or at least a switching at a reduced voltage is provided here, thus reducing energy losses. A corresponding third pulse closing the first switch is denoted with reference numeral 42 in FIG. 4. In particular, in the example of FIG. 1A by closing low side switch 12 during this phase, capacitor 15 is effectively transferring stored energy to the secondary side by connecting the series connection of capacitor 15 and primary winding 13 to ground via low side switch 12. In a resonant converter like the converter shown in FIG. 1A, at this point a resonance occurs, causing the current Ihb being different from the magnetizing current Imag. In particular, the resonance is visible as a sinusoidal like form of current Ihb denoted with reference numeral 48 in FIG. 4.

After 34, at 35 a third pause follows, which is denoted by reference numeral 45 in the example of FIG. 4.

This third pause allows demagnetization of the transformer which correspond to the magnetizing current Imag (as Ihb, which at this time corresponds to Imag) to reach zero, for example at 49 in FIG. 4. In some embodiments, the voltage Vzcd is used as an indicator of this full demagnetization, when Vzcd reaches zero Volt. After third pause 13, the switching cycle is complete, and a next switching cycle starts again at 30 in FIG. 3.

The end of the third pause and the beginning of a new switching cycle may be determined monitoring the voltage Vzcd. As seen in FIG. 4, some oscillations may occur in the current. An optimized time for closing the first switch again, corresponding to applying the next first pule 40 in FIG. 4, is when the Voltage Vhb is at a minimum (for example at 412 in FIG. 4), as here the voltage across the first switch (switch 12 in case of FIG. 1A) is at a minimum and therefore switching losses are reduced, corresponding to a demagnetization of the transformer. This minimum of Vhb always occurs at a certain time after Vzcd crosses zero from the negative value to a positive value, for example at 413 in FIG. 4. Therefore, in some embodiments the third pause is ended a predefined time after Vzcd crosses from a negative value to a positive value, or, in other words, closing the first switch at 30 in FIG. 3 is performed a predefined time after a rising edge of Vzcd crosses zero. In case the method is applied to the converter of FIG. 1B, instead of a minimum a maximum value of Vhb may be aimed at.

As shown in FIG. 1 and also in FIG. 5 explained below, Vzcd may be a voltage derived from an auxiliary winding of a transformer. In other embodiments, other signals indicating demagnetization of a transformer and/or an extremum of voltage Vhb like a zero crossing may be used. For example, in some implementations voltage Vhb may be measured directly or indirectly at the node between high-side switch 11 and low-side switch 12 of FIG. 1.

However, in other embodiments other durations of the third pause may be used.

The duration of closing the second switch at 32 (duration of pulse 41 in FIG. 1) is used to regulate the amount of energy to be transferred eventually to the secondary side and may therefore be used to regulate an output voltage. For example, as a simple regulation, when the output voltage Vout of FIG. 1A is below a desired (nominal) output voltage, the pulse duration may be increased, and when the output voltage is above a desired output voltage, the pulse duration may be decreased.

Also, the length of the third pause may be varied to modify the operation frequency (frequency of switching cycles) and the power transferred to the secondary side. The duration of closing the first switch at 34 (third pulse 42 in FIG. 2) in embodiments may be selected to be longer than one half of the resonant period (longer than the resonance 48). The length of the resonant period of the resonant tank is $T=2\pi\sqrt{LlkCr}$, where Llk is the leakage inductivity of the primary winding of the transformer. In a case where an additional inductor like inductor 18 of FIG. 1B is required, instead of Llk the effective complete inductivity formed by the leakage inductivity of primary winding 13 and this additional inductor is used for calculating T. However, in other embodiments, the closing of the first switch at 34 may be shorter than one half of the resonant period or even longer than the resonant period.

Therefore, various modifications to the pulse length shown may be provided.

Figure 5:
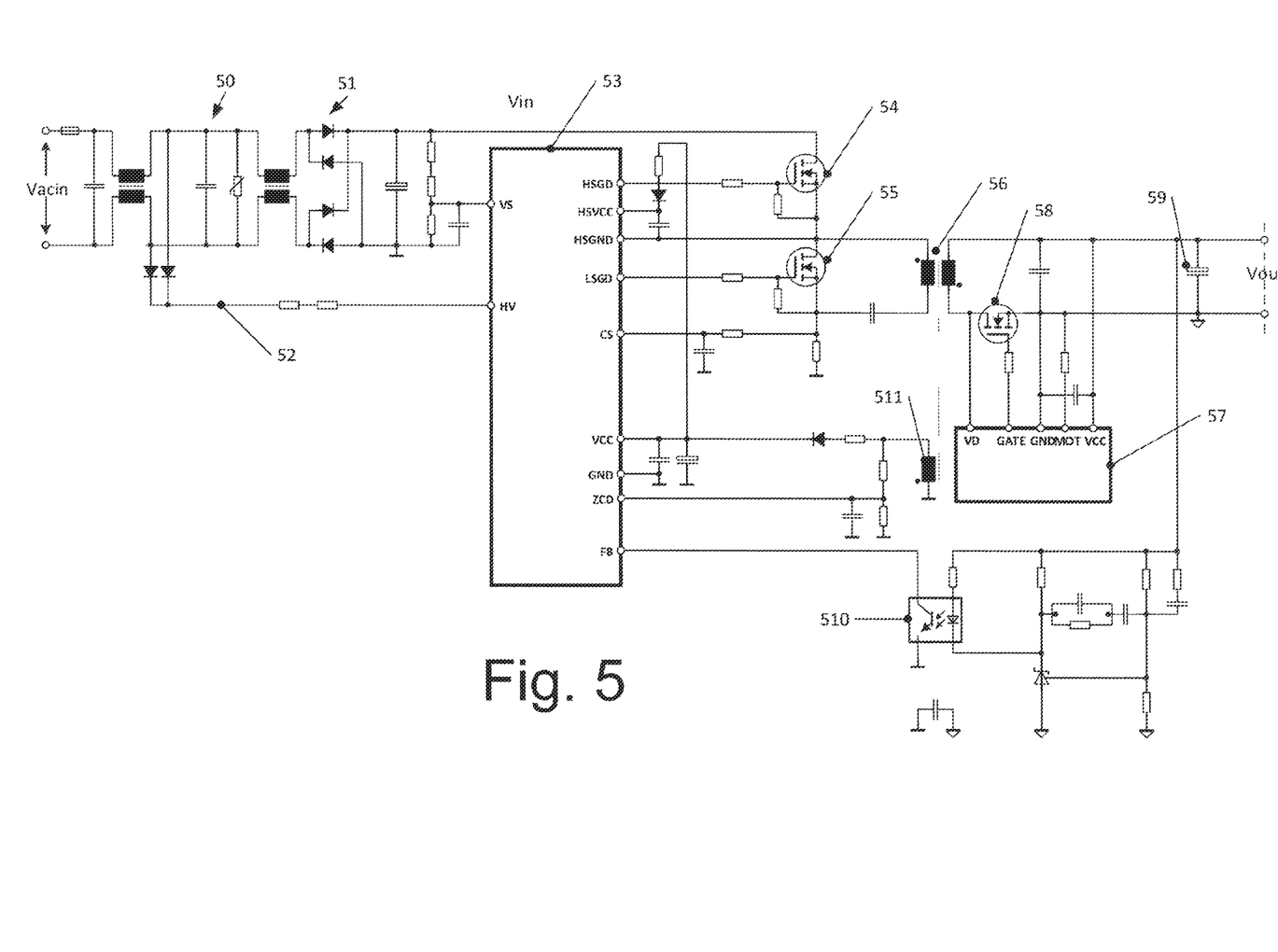
FIG. 5 is a circuit diagram illustrating an APWM HB flyback converter according to an embodiment.

FIG. 5 is a detailed circuit diagram of an APWM flyback converter according to an embodiment. While numerous details are shown in FIG. 5, it should be noted that other configurations are also possible. The circuit of FIG. 5 is used as a basis for simulations explained thereafter.

The converter of FIG. 5 receives an AC input voltage Vacin. Input voltage Vacin may be a varying voltage, for example between about 80 and about 264 Vac, corresponding to mains voltages in different countries. This voltage is filtered by a filtering stage 50 and rectified by a rectifier stage 51 to provide a DC input voltage Vin. Via a path 52 information regarding the magnitude of voltage Vacin is provided to a controller 53 at an input HV thereof. Furthermore, via a voltage divider at an input VS of controller 53 a signal giving information about the magnitude of Vin is provided.

In addition to filtering circuit 50 and rectifier circuit 51, in some embodiments power factor correction (PFC) may be provided in any conventional manner.

Controller 53 controls a high side switch 54 and a low side switch 55 according to techniques as discussed above. In particular, at least in one embodiment controller 53 controls switches 54, 55 with a method as explained with reference to FIG. 3, for example using signals similar to the ones discussed with reference to FIG. 4.

Using switches 54, 55, energy is transferred to a primary winding of a transformer 56. An output voltage Vout is provided by a secondary winding of transformer 56 rectified using a synchronous rectifier (SR) comprising a synchronous rectifier switch 58 controlled by a synchronous rectifier controller 57. An output capacitor 59 serves for filtering the rectified voltage.

An auxiliary winding 511 serves for receiving the feedback voltage Vzcd at a terminal ZCD of controller 53. This voltage may be used to determine length and position of some of the pulses, as explained with reference to FIGS. 3 and 4 above. The output voltage Vout is also fed back via a feedback path to an input FB of controller 53 via an optocoupler 510 providing galvanic isolation. This feedback signal may be used to determine the duration of the second pulse 41 in FIG. 4, i.e. the duration of the closing of the second switch (high side switch 54 in the example of FIG. 5) and therefore the amount of energy to be transferred to the secondary side by comparing the voltage Vout with a target value for the output voltage as explained previously.

Figure 6:
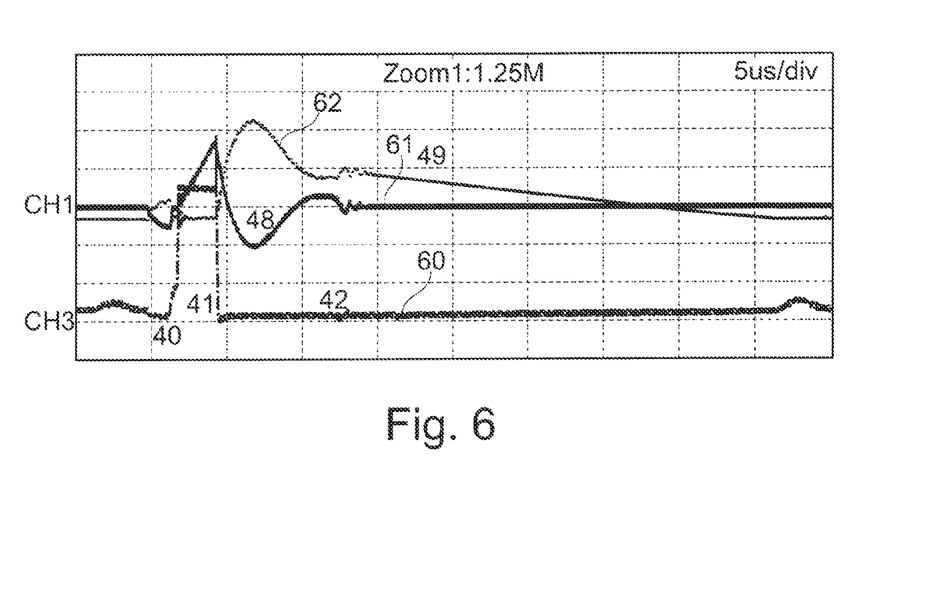
FIGS. 6 and 7 illustrate simulation results for the embodiment of FIG. 5.
Figure 7:
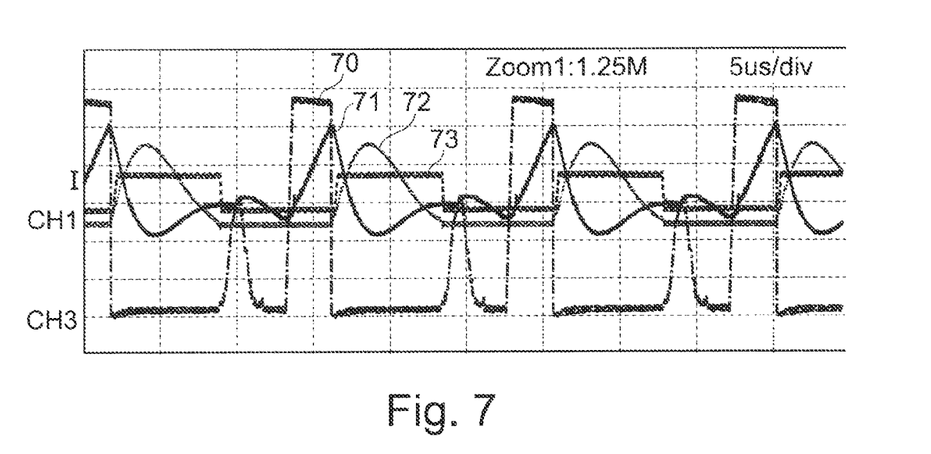

FIGS. 6 and 7 show measurements illustrating operation of the circuit of FIG. 5 according to techniques as disclosed herein, i.e. using the method of FIG. 4 with the first to third pulses 40 to 42 explained with reference to FIG. 4. FIG. 6 illustrates measurements essentially for a single switching cycle, whereas FIG. 7 illustrates measurements over a plurality of switching cycles.

In FIG. 6, a curve 60 shows the voltage Vhb at a node between switches 54, 55 in FIG. 5, a curve 61 shows the current Ihb flowing to the primary winding of transformer 56 in FIG. 5, and a curve 62 shows the secondary side current Isec. In FIG. 7, a curve 70 shows the voltage Vhb, a curve 71 shows the current Ihb, a curve 72 shows the secondary side current Isec, and a curve 73 additionally shows a voltage at the gate of synchronous rectifier switch 58 in FIG. 5.

As mentioned, before the measurement of FIG. 7 the switching cycle used for measuring FIG. 6 was repeated a plurality of times.

The position of pulses 40 to 42 of FIG. 4 are marked in FIG. 6 with the corresponding reference numerals. Additionally, reference numerals 48 and 49 show the corresponding portions of Ihb, see also FIG. 4.

Figure 8:
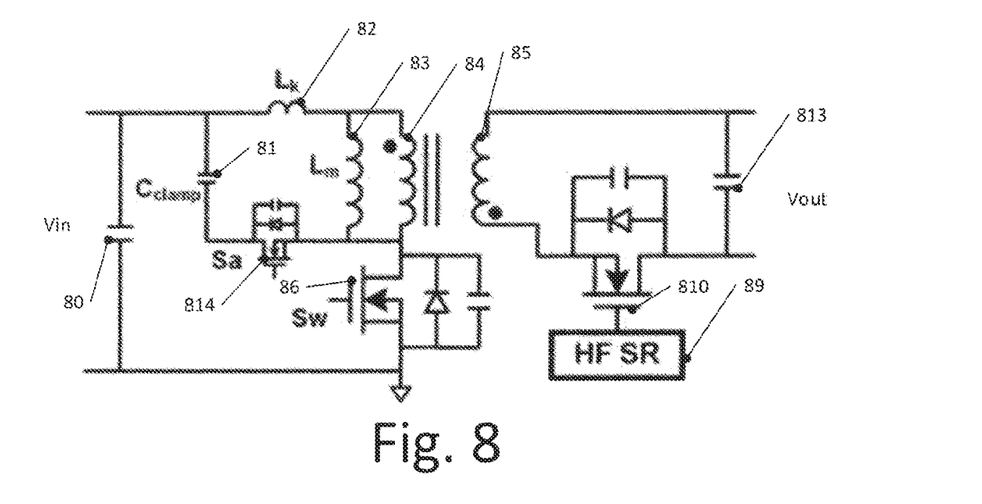
FIG. 8 illustrates a circuit diagram of a converter according to a further embodiment.

The above embodiments have been described for APWM HB flyback converters. As mentioned, techniques disclosed herein may also be applied to other converter topologies. As an example for another topology to which techniques disclosed herein may be applied, FIG. 8 shows a half bridge flyback converter for converting an input voltage Vin to an output voltage Vout. The converter comprises an input capacitor 80, a clamp capacitor 81, a first inductor 80, a second inductor 83, a transformer comprising a primary winding 84 and a secondary winding 85, a first primary side switch 86 and a second primary side switch 814. First primary side switch 86 plays the role of the first switch in the method of FIG. 3, and second primary side switch 814 plays the role of the second switch in the embodiment of FIG. 3, when the method of FIG. 3 is applied. On the secondary side, the converter of FIG. 8 comprises an output capacitor 813 and a synchronous rectifier switch 810 controlled by a synchronous rectifier controller 89. A controller (not shown in FIG. 8) like controller 20 of FIG. 2 controls switches 86, 814. Switches 86, 814 and 810 are each shown with a diode (for example body diode) and capacitance (for example parasitic capacitance) coupled parallel to the respective switch. The converter of FIG. 8 is just one example of an additional converter topology which may be controlled using techniques disclosed herein.

Some embodiments are defined by the following examples.

Example 1

A power converter controller, comprising:
a first switch driver operative to drive a first primary side switch of the power converter,
a second switch driver operative to control a second primary side switch of the power converter, and
a control logic which, in at least one mode of operation, is operative to, in each switching cycle:
control the first switch driver to close the first primary side switch for a first time duration,
after the first time duration, control the first and second switch drivers to open the first and second primary side switches to be open for a first pause duration,
after the first pause duration, control the second switch driver to close the second primary side switch for a second time duration,
after the second time duration, control the first and second switch drivers to open the first and second primary side switches for a second pause duration,
after the second pause duration, control the first switch driver to close the first primary side switch for a third time duration; and
after the third time duration, control the first and second switch drivers to open the first and second primary side switches for a third pause duration.

Example 2

The power converter controller of example 1, wherein the control logic is operative to end the third pause duration and start the first time duration of a next switching cycle at an extremal value of a voltage at a node between the first primary side switch and the second primary side switch.

Example 3

The power converter controller of example 2, wherein the extremal value is a minimum value.

Example 4

The power converter controller of example 2 or 3, wherein a time position of the extremal value is determined based on a signal indicative of demagnetization of a transformer of the power converter.

Example 5

The power converter controller of example 4, wherein the signal indicative of demagnetization of a transformer is a signal from an auxiliary winding of the transformer, and the time position of the extremal value is determined to be a predetermined time after a rising edge of the signal from the auxiliary winding of the power converter crosses zero.

Example 6

The power converter controller of any one of examples 1 to 5, wherein the control logic is operative to determine the second time duration based on a feedback from an output of the power converter.

Example 7

The power converter controller of any one of examples 1 to 6, wherein a length of the third pause duration is set to allow demagnetization of a transformer of the power converter.

Example 8

The power converter controller of any one of examples 1 to 7, wherein the second pause duration is set to reduce a voltage across the first primary side switch.

Example 9

A power converter, comprising:
the power converter controller of any one of examples 1 to 8, the first primary side switch,
the second primary side switch, and
a transformer coupled to a node between the first primary side switch and the second primary side switch.

Example 10

The power converter of example 9, wherein the power converter is designed such that energy is transferred to the secondary side of the transformer during the third time duration.

Example 11

The power converter of example 9 or 10, wherein the power converter is an asymmetric pulse with modulation half bridge flyback converter.

Example 12

The power converter of any one of examples 9 to 11, wherein the transformer comprises an auxiliary winding coupled to an input of the power converter controller.

Example 13

The power converter of any one of examples 9 to 12, wherein the third time duration is set to be equal to or greater than half a resonance period of a resonant tank of the power converter.

Example 14

A method for controlling a power converter, comprising, in each switching cycle:
closing a first primary side switch of a power converter for a first time duration,
after the first time duration, opening the first primary side switch and a second primary side switch of the power converter for a first pause duration,
after the first pause duration, closing the second primary side switch for a second time duration,
after the second time duration, opening the first and second primary side switches for a second pause duration,
after the second pause duration, closing the first primary side switch for a third time duration; and
after the third time duration, opening the first and second primary side switches for a third pause duration.

Example 15

The method of example 14, further comprising ending the third pause duration and starting the first time duration of a next switching cycle at an extremal value of a voltage between the first primary side switch and the second primary side switch.

Example 16

The method of example 15, wherein a time position of the extremal value is determined based on a signal indicative of demagnetization of a transformer of the power converter.

Example 17

The method of example 16, wherein the signal indicative of demagnetization of a transformer is a signal from an auxiliary winding of the transformer, and the time position of the extremal value is determined to be a predetermined time after a rising edge of the signal from the auxiliary winding of the power converter crosses zero.

Example 18

The method of any one of examples 14 to 17, further comprising determining the second time duration based on a feedback from an output of the power converter.

Example 19

The method of any one of examples 14 to 18, further comprising setting a length of the third pause duration to allow demagnetization of a transformer of the power converter.

Example 20

The method of any one of examples 14 to 19, further comprising setting the second pause duration to reduce a voltage across the first primary side switch.

Example 21

The method of any one of examples 14 to 18, further comprising transferring energy to the secondary side of a transformer of the power converter during the third time duration.

Example 22

The method of any one of examples 14 to 21, further comprising setting the third time duration to be equal to or longer than half a resonance period of a resonant tank of the power converter.

Example 23

A computer program comprising a program code, which, when executed on one or more processors, causes the method of any one of examples 14 to 22 to be carried out.

Example 24

A tangible storage medium comprising the computer program of example 23.

Example 25

A device for controlling a power converter, comprising, in each switching cycle:
means for closing a first primary side switch of a power converter for a first time duration,
after the first time duration, means for opening the first primary side switch and a second primary side switch of the power converter for a first pause duration,
after the first pause duration, means for closing the second primary side switch for a second time duration,
after the second time duration, means for opening the first and second primary side switches for a second pause duration, after the second pause duration, means for closing the first primary side switch for a third time duration; and
after the third time duration, means for opening the first and second primary side switches for a third pause duration.

Example 26

The device of example 25, further comprising means for ending the third pause duration and means for starting the first time duration of a next switching cycle at an extremal value of a voltage between the first primary side switch and the second primary side switch.

Example 27

The device of example 26, wherein a time position of the extremal value is determined based on a signal indicative of demagnetization of a transformer of the power converter.

Example 28

The device of example 27, wherein the signal indicative of demagnetization of a transformer is a signal from an auxiliary winding of the transformer, and the time position of the extremal value is determined to be a predetermined time after a rising edge of the signal from the auxiliary winding of the power converter crosses zero.

Example 29

The device of any one of examples 25 to 28, further comprising means for determining the second time duration based on a feedback from an output of the power converter.

Example 30

The device of any one of examples 25 to 29, further comprising means for setting a length of the third pause duration to allow demagnetization of a transformer of the power converter.

Example 31

The device of any one of examples 25 to 30, further comprising means for setting the second pause duration to reduce a voltage across the first primary side switch.

Example 32

The device of any one of examples 25 to 31, further comprising means for transferring energy to the secondary side of a transformer of the power converter during the third time duration.

Example 33

The device of any one of examples 25 to 32, further comprising means for setting the third time duration to be equal to or longer than half a resonance period of a resonant tank of the power converter.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

The invention claimed is:

1. A power converter controller for an asymmetric pulse width modulation half bridge flyback converter, the power converter controller comprising:
 a first switch driver operative to drive a first primary side switch of the asymmetric pulse width modulation half bridge flyback converter;
 a second switch driver operative to control a second primary side switch of the asymmetric pulse width modulation half bridge flyback converter; and
 control logic operative to, in a first switching cycle of multiple switching cycles:
  control the first switch driver to close the first primary side switch for a first time duration,
  after the first time duration, control both the first switch driver and the second switch driver to open both the first primary side switch and the second primary side switch to be open for a first pause duration,
  after the first pause duration, control the second switch driver to close the second primary side switch for a second time duration,
  after the second time duration, control both the first switch driver and the second switch driver to open both the first primary side switch and the second primary side switch for a second pause duration,
  after the second pause duration, control the first switch driver to close the first primary side switch for a third time duration; and
  after the third time duration, control both the first switch driver and the second switch driver to open both the first primary side switch and the second primary side switch for a third pause duration.

2. The power converter controller as in claim 1, wherein the control logic is operative to end the third pause duration and start the first time duration of a second switching cycle at an extremal value of a voltage at a node between the first primary side switch and the second primary side switch, the second switching cycle being a next switching cycle of the multiple switching cycles after the first switching cycle.

3. The power converter controller as in claim 2, wherein the extremal value is a minimum value.

4. The power converter controller as in claim 3, wherein a time position of the extremal value is determined based on a signal indicative of demagnetization of a transformer of the asymmetric pulse width modulation half bridge flyback converter.

5. The power converter controller as in claim 4, wherein the signal indicative of demagnetization of the transformer is a signal from an auxiliary winding of the transformer, and the time position of the extremal value is determined to be a predetermined time after a rising edge of the signal from the auxiliary winding of the asymmetric pulse width modulation half bridge flyback converter crosses zero.

6. The power converter controller as in claim 1, wherein the control logic is operative to determine the second time duration based on a feedback from an output of the asymmetric pulse width modulation half bridge flyback converter.

7. The power converter controller as in claim 1, wherein a length of the third pause duration is set to demagnetize a transformer of the asymmetric pulse width modulation half bridge flyback converter.

8. The power converter controller as in claim 1, wherein the second pause duration reduces a voltage across the first primary side switch.

9. A power converter comprising:
 the power converter controller of claim 1; and
 the first primary side switch, the second primary side switch, and a transformer coupled to a node between the first primary side switch and the second primary side switch.

10. The power converter as in claim 9, wherein a primary winding of the transformer is operative to convey energy to a secondary winding of the transformer during the third time duration.

11. The power converter as in claim 10, wherein the third time duration is at least half a resonance period of a resonant tank of the power converter.

12. The power converter controller as in claim 1, wherein the control logic is further operative to: demagnetize a winding of a transformer during the third pause duration of the first switching cycle.

13. The power converter controller as in claim 12, wherein the control logic is further operative to:
execute a second switching cycle of the multiple switching cycles upon completion of the third pause duration of the first switching cycle.

14. The power converter controller as in claim 13, wherein the control logic is further operative to, in the second switching cycle of the multiple switching cycles:
close the first primary side switch for a fourth time duration,
after the fourth time duration, open both the first primary side switch and the second primary side switch for a fourth pause duration,
after the fourth pause duration, close the second primary side switch for a fifth time duration,
after the fifth time duration, open both the first primary side switch and the second primary side switch for a fifth pause duration,
after the fifth pause duration, close the first primary side switch for a sixth time duration; and
after the sixth time duration, open both the first primary side switch and the second primary side switch for a sixth pause duration.

15. The power converter controller as in claim 1, wherein the control logic is further operative to:
control the first primary side switch and the second primary side switch in accordance with a discontinuous conduction mode of generating a respective output voltage.

16. The power converter controller as in claim 1, wherein the first primary side switch is a low-side switch operative to selectively connect a primary winding of a transformer to a ground reference voltage; and
wherein the second primary side switch is a high-side switch operative to selectively connect the primary winding to an input voltage, a secondary winding of the transformer operative to produce an output voltage based on energy received from the primary winding.

17. The power converter controller as in claim 1, wherein the first primary side switch and the second primary side switch are coupled to each other via a common node; and
wherein the first time duration of closing the first primary side switch is operative to increase a voltage magnitude of the common node.

18. The power converter controller as in claim 17, wherein the second primary side switch is operative to electrically connect an input voltage to the common node during the second time duration.

19. The power converter controller as in claim 17, wherein the second time duration of closing the second primary side switch is operative to provide energy to a primary winding of a transformer from an input voltage through the second primary side switch; and
wherein the third time duration of closing the first primary side switch is operative to transfer the energy in the primary winding to a secondary winding of the transformer.

20. The power converter controller as in claim 19, wherein the second pause duration reduces a respective voltage across the first primary side switch.

21. The power converter controller as in claim 1, wherein a voltage across a drain node and a source node of the second primary side switch is substantially zero at a start of the second time duration.

22. The power converter controller as in claim 1, wherein the control logic is further operable to initiate closure of the first primary side switch for the first time duration after a predefined amount of time after detecting a zero crossing condition indicating demagnetization of a transformer.

23. The power converter controller as in claim 1, wherein closure of the first primary side switch is operative to couple a first reference voltage input to a primary winding path of a transformer; and
wherein closure of the second primary side switch is operative to couple a second reference voltage input to the primary winding path of the transformer.

24. The power converter controller as in claim 23, wherein closure of the first primary side switch for the first time duration supports zero voltage switching of the second primary side switch at a start of the second time duration.

25. The power converter controller as in claim 24, wherein closure of the second primary side switch for the second time duration inputs energy into a primary winding of a transformer;
wherein closure of the first primary side switch for the third time duration conveys the energy from the primary winding to a secondary winding of the transformer; and
wherein the second reference voltage is an input voltage converted into an output voltage outputted from the secondary winding.

26. A method of controlling a power converter, the method comprising:
in each switching cycle of multiple switching cycles:
closing a first primary side switch of the power converter and opening a second primary side switch for a first time duration;
after the first time duration, opening both the first primary side switch and the second primary side switch of the power converter for a first pause duration;
after the first pause duration, closing the second primary side switch and opening the first primary side switch for a second time duration;
after the second time duration, opening both the first primary side switch and the second primary side switch for a second pause duration;
after the second pause duration, closing the first primary side switch and opening the second primary side switch for a third time duration; and
after the third time duration, opening both the first primary side switch and the second primary side switch for a third pause duration.

27. The method as in claim 26 further comprising:
ending the third pause duration of a first switching cycle and starting the first time duration of a second switching cycle at an extremal value of a voltage at a node coupling the first primary side switch and the second primary side switch.

28. The method as in claim 27, wherein a time instance of the extremal value is determined based on a signal indicative of demagnetization of a transformer of the power converter.

29. The method as in claim 28, wherein the signal indicative of demagnetization of the transformer is a signal from an auxiliary winding of the transformer, and the time position of the extremal value is determined to be a predetermined time after a rising edge of the signal from the auxiliary winding of the power converter crosses zero.

30. The method as in claim 26 further comprising: determining the second time duration based on feedback from an output of the power converter.

31. The method as in claim 30 further comprising: setting a length of the third pause duration to demagnetize a transformer of the power converter.

32. The method as in claim 26 further comprising: setting the second pause duration, the setting of the second pause duration reducing a voltage across the first primary side switch.

33. The method as in claim 26 further comprising: transferring energy to a secondary side of a transformer of the power converter during the third time duration.

34. The method as in claim 26 further comprising: setting the third time duration to at least half a resonance period of a resonant tank setting of the power converter.

\* \* \* \* \*